US006808038B2

United States Patent
Schneider

(10) Patent No.: US 6,808,038 B2
(45) Date of Patent: Oct. 26, 2004

(54) RETAINING DEVICE FOR UTILITY VEHICLES

(75) Inventor: Boris Sebastian Heinrich Schneider, Laudenbach (DE)

(73) Assignee: Schneider Fahrkomfort GmbH, Mannheim (DE)

( * ) Notice: Subject to any disclaimer, the term of this patent is extended or adjusted under 35 U.S.C. 154(b) by 152 days.

(21) Appl. No.: 10/091,218

(22) Filed: Feb. 27, 2002

(65) Prior Publication Data

US 2002/0153718 A1 Oct. 24, 2002

Related U.S. Application Data

(63) Continuation-in-part of application No. 09/415,790, filed on Oct. 8, 1999, now abandoned.

(30) Foreign Application Priority Data

Oct. 10, 1998  (DE) ...................................... 298 18 149 U

(51) Int. Cl.[7] .............................................. B60R 21/02
(52) U.S. Cl. ................... 180/271; 280/748; 296/190.03
(58) Field of Search .............................. 180/89.12, 271;
280/748, 756; 296/146.1, 147, 148, 190.03, 190.11

(56) References Cited

U.S. PATENT DOCUMENTS

| 2,682,427 | A | * | 6/1954 | Bright | 296/148 |
|---|---|---|---|---|---|
| 3,632,134 | A | * | 1/1972 | Babbitt, Jr. et al. | 280/756 |
| 3,841,430 | A | * | 10/1974 | Babbitt, Jr. et al. | 180/89.12 |
| 4,079,985 | A | * | 3/1978 | Martin | 296/190 |
| 4,135,757 | A | * | 1/1979 | Smith et al. | 296/190 |
| 4,392,660 | A | * | 7/1983 | Mason et al. | 280/751 |
| 4,392,669 | A | * | 7/1983 | Martin, Jr. | 280/775 |
| 4,397,371 | A | * | 8/1983 | Lynnes et al. | 180/271 |
| 4,579,191 | A | * | 4/1986 | Klee et al. | 180/268 |
| 4,621,859 | A | * | 11/1986 | Spicher | 296/77.1 |
| 4,652,043 | A | * | 3/1987 | Hurlburt | 296/190 |
| 4,932,714 | A | * | 6/1990 | Chance | 296/148 |
| 5,135,080 | A | * | 8/1992 | Haston | 187/222 |
| 5,273,340 | A | * | 12/1993 | Nelson et al. | 296/190 |
| 5,393,118 | A | * | 2/1995 | Welborn | 296/147 |
| 5,529,369 | A | * | 6/1996 | Welborn | 296/146.1 |
| 5,941,330 | A | * | 8/1999 | Miller et al. | 180/89.15 |
| 5,971,434 | A | * | 10/1999 | Neufeld et al. | 280/756 |

FOREIGN PATENT DOCUMENTS

| DE | 43 15 824 | | 11/1994 |
|---|---|---|---|
| EP | 0 233 670 | | 2/1987 |
| JP | 56-47335 | * | 4/1981 |
| JP | A-10-129992 | | 10/1998 |

* cited by examiner

Primary Examiner—Paul N. Dickson
Assistant Examiner—Laura B. Rosenberg
(74) Attorney, Agent, or Firm—Collard & Roe, P.C.

(57) ABSTRACT

A general retaining device for use with utility vehicles, such as fork lift trucks, tractors, construction and agricultural machines, and public utility vehicles for protecting the driver from centrifugal forces. The invention is attached to all canopy guards with front and rear struts, and is open on all sides. The side openings of the canopy guard protecting the driver are divided by means of an approximately horizontally extending support which is pivoted on the one strut by a hinge and retained on the other strut by means of a locking system.

9 Claims, 2 Drawing Sheets

RETAINING DEVICE FOR UTILITY VEHICLES

This is a continuation-in-part of U.S. patent application Ser. No. 09/415,790 filed on Oct. 8, 1999, now abandoned, which is based on German No. 298 18 149.5 filed on Oct. 10, 1998.

BACKGROUND OF THE INVENTION

1. Field of the Invention

The invention relates to a retaining device for utility vehicles, such as fork-lift trucks, tractors, construction and agricultural machines and public utility vehicles, with a canopy protecting the driver or operator from falling out of the vehicle while overturning. The roof or canopy has front and rear struts, and is at first—without the novel retaining device—open to the sides.

The invented retaining device is qualified to absorb centrifugal forces up to 1400 Newton proved in various tests in a research project from the Gerhard-Mercator-University Duisburg, Germany, Faculty Mechanical Engineering, subject group product engineering. These forces are usually experienced during narrow curves in which the most accidents according to the German compulsory casualty insurances occurs. Standard canopies do not protect from these forces.

To reach this target the novel retaining system which is attached between front and rear struts on the driver's open side protect exactly three important body points of the driver or operator: the Shoulder-Point, the Hip-Point, and the Knee-Point (see FIG. 2).

Furthermore this retaining system is especially designed for retrofitting all canopy guards based on the SRP (seat reference point) of the driver seat and 5 configuration parameters.

2. Background of the Invention

With increasing numbers of accidents with fork lift trucks outfitted only with canopies which are usually open on their sides, it was obviously urgent to take appropriate action in order to reduce these accidents with the invention of an effective retaining device which prevents a lateral falling out by overturning of a vehicle or by speeding up in curves. A retaining system is needed which combines all following advantages: a) Low cost b) easy in construction c) easy and quick to refit d) with a high acceptance to the driver and e) with a guarantee of a maximum liberty of action for the driver leaning forward and outward or slewing while shunting the vehicle.

The retaining device of the invention is particular for vehicles with no cabs and no doors, such as vehicles with overhead guards which are open to all sides though they have a frame. The invention differs from those patents which guarantee driver's protection with a complex roll protective frame or a complex, elaborate and expensive door and cab arrangement is the combination of the advantages a) to e) described above.

Seat integrated and other indoor retaining systems like safety-belts restrict the necessary liberty of action and the driver's acceptance.

3. The Prior Art

The usual retaining systems of utility vehicles are either steel doors or seat belts or bows mounted at suitable fastening sites inside the vehicle. The important difference and also drawback of most of these prior art seat-belt-systems is that belts or bows have to be put on and locked, which is time-consuming and uncomfortable for the driver. This, however, is not done in many cases when driver or operator are necessarily frequently boarding and leaving the vehicle while shunting and ranking. Another significant difference is that special fastening points are required for installing seat belts, which in turn requires changes in the construction of the engine hood.

The present invention does not need special fastening points. It can be mounted easily between the rear and front struts without changing any construction of the frame. In a further difference, safety belts are primarily constructions to prevent falling into the front and not to prevent falling out like the invented novel system. And in contrast to all other retaining systems with automatically locking seat bows or complex steel doors, the novel invented retaining system guarantees the driver a maximum freedom of movement and a maximum view and visibility. A safety belt or safety bow retains the driver on the seat.

This invention is especially for vehicles with no cabs and no doors such as vehicles with overhead guards which are open to all sides though they have a frame. This is an important difference from U.S. Pat. Nos. 3,841,430 and 4,079,985. These patents guarantee the protection with a complex roll protective frame and cab arrangement, missing the combination of the advantages described above.

The thin tube of the door construction in U.S. Pat. No. 5,529,369 is used as support and mounting for a door construction which provides more comfort against weather and rain in opposition to the normally open-air carts without the intention of giving a maximum liberty of action for the driver. Furthermore compared to FIG. 2 it can be seen that the SRP (seat reference point) of this patent is behind the door construction, and therefore the protection against centrifugal forces is not an intention of the patent.

This invention is qualified to catch (intercept, absorb) centrifugal force up to 1400 Newton proved in various tests in a research project from the Gerhard-Mercator-University Duisburg, Germany, Faculty Mechanical Engineering, subject group product engineering.

A door or a cabin separate into "inside" and "outside". The invented novel retaining system integrates these two spaces, so that it is not necessary for the driver to open the door during a risky maneuver. The driver's body is free from a safety system such as DE 43 15 824 and therefore the novel retaining system according to the invention is more acceptable to the driver.

The conceptual advantage over a door is due to the ease of utilization (which means no development is necessary for adaption of a specific forklift truck) and low cost. A door is a more general term for an openable side weather protection and is therefore not necessarily suited for the purpose of this invention.

SUMMARY OF THE INVENTION

The retaining system according to the invention is fixed between the rear and front struts. It is a horizontally extending support consisting of two bows, whereby on one strut the support is connected and pivoted with a hinge, and on the other strut linked in a locking system like a snap bolt or a rotary drop lock. In completion of the advantages a) to e) listed above, the present invention is a successful and effective combination to reach driver's safety and protection because it can be mounted in a simple manner, it reduces drivers's risk from falling out while centrifugal forces are acting on it and assures simple handling and a high driver's acceptance.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar references characters denote similar elements throughout the several views.

DETAILED DESCRIPTION OF THE PREFERRED EMBODIMENT

Figure 1:
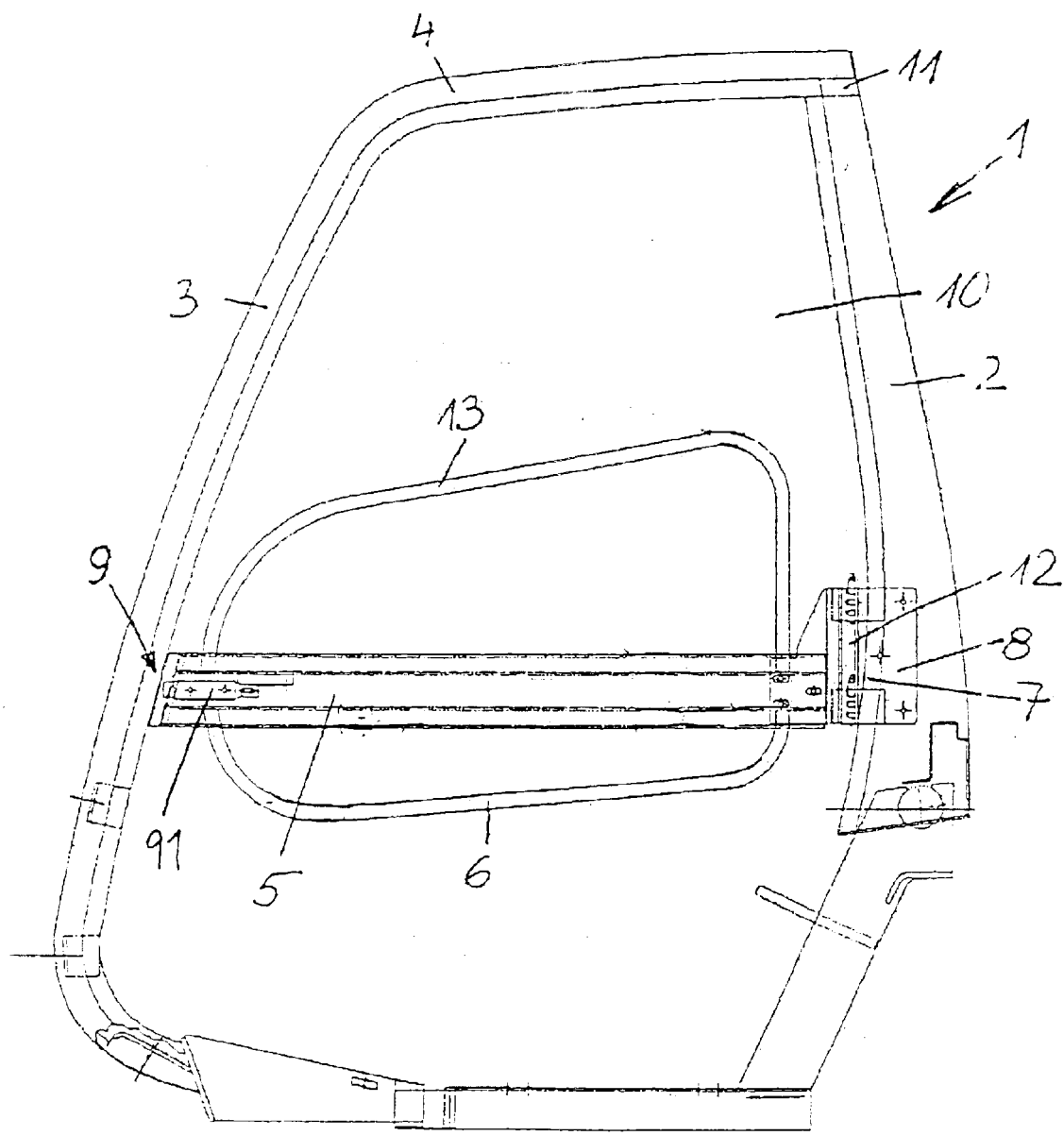
FIG. 1 is a side view of the roof protecting the driver of a fork—lift truck with the retaining system as defined by the invention.
Figure 2:
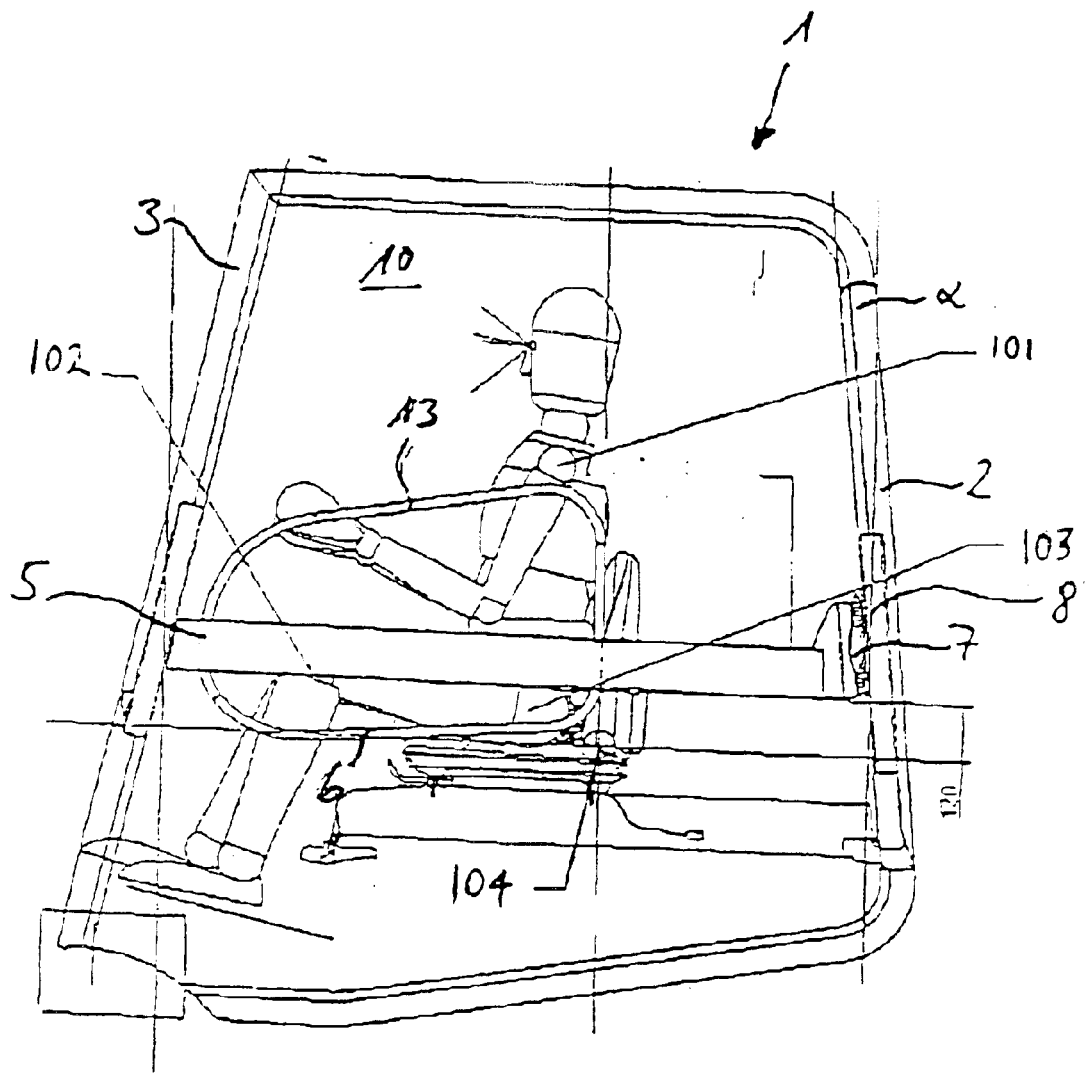
FIG. 2 is an embodiment of a standard scheme showing the exact positions of the protecting points for shoulder, knee and hip. It is also showing the 5 parameters of the adaption of the invention regarding the SRP (seat reference point) for a Still 6024-25 fork lift truck.

Referring now in detail to the drawings and, in particular FIG. 1 and FIG. 2, there is shown a canopy 1, protecting the driver, which consists of struts which are joined to each other to form a frame-like construction, whereby a side opening 10 is formed by the frame, consisting of the roof cage 4, with transverse struts 11, a rear strut 2 and a front strut 3. The retaining system is arranged in the lower third of the side openings 10 within the frames of roof 1 protecting the driver. A corresponding frame is located on the opposite side, connecting the transverse struts 1. The retaining system consists of a transverse support 5 and a lower bow 6, the two components extending with a spacing between each other. In the present case, transverse support 5 also can serve as a support for a "light door", and for equipment accessories, such as bottle holders. Components 5 and 6 have a tubular profile. Support 5, which is widened or flattened as compared to lower bow 6, prevents a person from slipping through. Support 5 and bow 6 are mounted in the region of rear strut 2 on a hinge 7, and have a locking system on the side disposed opposite front strut 3. This locking system can be designed, for example, in the form of a snap bolt or a rotary drop lock 91. Components 5 and 6 extend approximately parallel with roof cage 4.

Hinge 7 has a hinge fastening 8 extending slightly inclined upwardly, similar to rear strut 2, so that the swivel axis 12, for components 5 and 6 extends slanted as well, and these components therefore fall to each other automatically. For example, hinge fastening 8 may have an angle of offset α from a vertical axis as shown in FIG. 2. If needed be, this can be achieved also with the help of a spring or similar device. To reduce the opening angle of components 5 and 6, the hinge can also be designed so that it projects into a part of opening 10, so that swivel axis 12 is displaced from strut 3. In the embodiment showed in FIG. 1, an upper bow 13 is provided, in addition to lower bow 6, wherein bow 13 is secured on transverse support 5 similar to lower bow 6. Upper box 13 and lower bow 6 may be secured to hinge fastening 8 by means of bolts. Hinge fastening 8 may be secured to rear strut 2 by means of bolts. Additionally, upper bow 13 and lower bow 6 may be secured directly to support 5. Bow 13 extends up to about half of the height between roof/canopy 4 and support 5, and in this way, provides a particularly good protection for the driver on the vehicle.

FIG. 2 shows three important body points of a driver passenger which may be protected by the retaining system according to the present invention. These are a shoulder point 101, knee point 102 and hip point 103. Upper bow 13 and lower bow 6 in the embodiment shown in FIG. 2 are not disposed on hinge fastening 8. Seat reference point SRP 104 is shown as the interesction of the center lines of the seat back surface and seat bottom surface.

Accordingly, while only two embodiments of the present invention have been shown and described, it is obvious that many changes and modifications may be made thereunto without departing from the spirit and scope of the invention.

What is claimed is:

1. A retaining device for preventing a driver or passenger from falling out, due to centrifugal force, of a forklift truck, tractor, construction machine, agricultural machine or public utility vehicle having open sides and a root or canopy guard having front and rear struts, the retaining device comprising:

a support extending approximately horizontally along and dividing the open sides of the vehicle;

a hinge for pivoting said support on the rear strut of the vehicle;

a locking system for retaining said support to the front strut of the vehicle; and an upper bow and lower bow coupled to said support and extending spaced apart from said support, wherein said upper bow extends to approximately one half of a height between said support and a root of the vehicle.

2. The retaining device according to claim 1, wherein said hing further comprises a hinge fastening arranged at an upward incline such that said support is automatically locked.

3. The retaining device according to claim 1, wherein said hinge projects into the open sides of the vehicle.

4. The retaining device according to claim 1, wherein said locking system comprises a snap bolt.

5. The retaining device according to claim 1, wherein said locking system comprises a rotary drop lock.

6. The retaining device according to claim 1, wherein the retaining device prevents the driver or passenger from falling out by holding the driver or passenger at a shoulder point, a knee point and a hip point.

7. The retaining device according to claim 1, wherein said device to suitable for installation on any vehicle having open sides and a roof or canopy guard having front and rear struts based on a seat reference point as a point of reference.

8. The retaining device according to claim 1, wherein said upper bow and said lower bow are coupled to the rear strut of the vehicle via said hinge.

9. The retaining device of claim 1, wherein said upper bow and said lower bow are secured directly to said support.

* * * * *